United States Patent Office

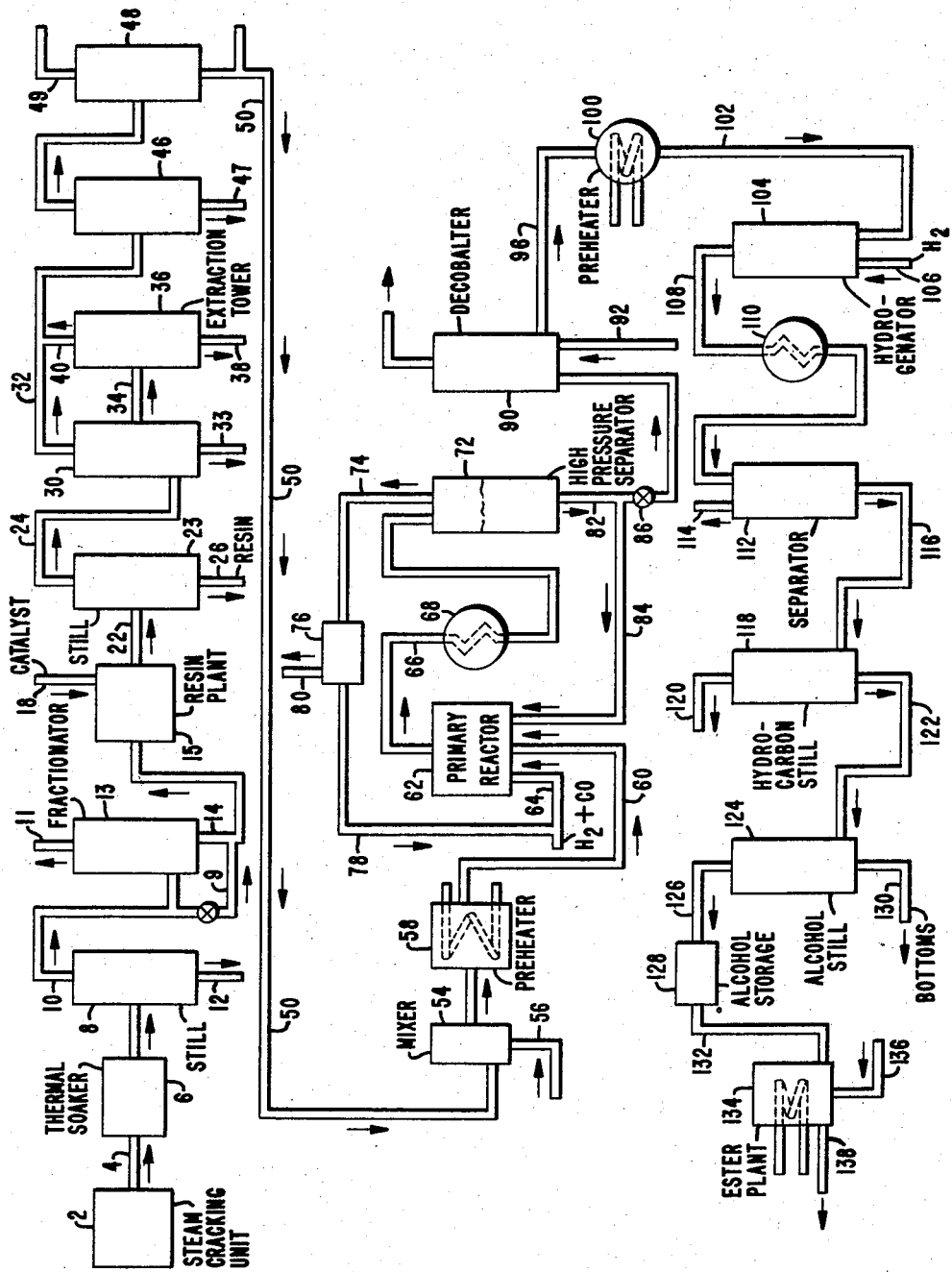

2,876,264
Patented Mar. 3, 1959

2,876,264

PLASTICIZER ALCOHOLS BY OXO PROCESS

Robert S. Brodkey, Roselle, William E. Catterall, Summit, Wilbur F. Fischer, Cranford, and Erving Arundale, Westfield, N. J., assignors to Esso Research and Engineering Company, a corporation of Delaware Application March 10, 1955, Serial No. 493,482

4 Claims. (Cl. 260—638)

The present invention relates to the preparation of oxygenated organic compounds by the reaction of carbon monoxide and hydrogen with olefinic hydrocarbons in the presence of a carbonylation catalyst. More specifically, the present invention relates to the preparation of improved alcohol products from interaction of CO, $H_2$, a cobalt carbonylation catalyst and selected olefin fractions. Still more specifically, the present invention relates to the preparation of alcoholic compositions which are particularly suitable as intermediates in the manufacture of ester type plasticizers. In one of its aspects, the present invention relates to the preparation of an olefin feed which, on oxonation and further processing, provides an outstanding plasticizing agent while, in another aspect, the present invention relates to a vinyl resin composition plasticized with the ester derived from the alcohol product.

The ever expanding use of plastic compositions such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with diolefins such as isoprene have created a large demand for suitable plasticizers. Alkyl esters, and particularly di-2-ethyl hexyl phthalate, di-n-octyl phthalate and tri-2-ethylhexyl phosphate have been used as plasticizers for the aforementioned high molecular weight materials, but the supply of these plasticizers has been unable to keep pace with the expansion of the plastics industry, largely because of a shortage of alcohols suitable for the manufacture of the desired esters.

The most recent development in the production of synthetic alcohols has been the application of the carbonylation or so-called Oxo reaction to olefinic hydrocarbons to produce plasticizer alcohols. In this process, $H_2$ and CO are reacted with olefinic hydrocarbons at temperatures of about 100° to 200° C. and pressures of from about 1500–4500 p. s. i. g. in the presence of a cobalt catalyst to produce an aldehyde product having one more carbon atom than the olefin. The aldehyde product is subsequently hydrogenated to the respective alcohol. With the introduction of this process there was thus made available for the production of higher molecular weight primary alcohols the large number of refinery streams containing olefin fractions derived and resulting from the processing of petroleum distillates and residua. Thus, available on a large scale are olefin fractions from thermal and catalytic cracking processes, olefin polymers and copolymers such as propylene and butylene dimers, trimers, tetramers or their copolymers, and the like. These sources all supply in large supply, olefin fractions containing substantial amounts of potential alcohol product. The most desirable alcohol product, from a plasticizer point of view, should have about 6–10 carbon atoms. The primary alcohols produced by the carbonylation reaction may be esterified with suitable acids such as phthalic, adipic, sebacic, phosphoric, aconitic and other di- and polybasic acids to yield plasticizing esters.

It has been found, however, that desirous as it is to employ the Oxo reaction on olefins and olefinic mixtures, particularly those derived on a large scale from petroleum sources, the plasticizing properties of the resulting esters have not always been satisfactory, regardless of the number of carbon atoms in the molecule. The most important characteristics in the plasticized composition are (1) plasticizer efficiency, (2) heat and light stability, (3) plasticizer migration and (4) volatility. It has been found, however, that $C_7$–$C_{10}$ alcohols prepared by the Oxo process tend to be deficient in one or more of these characteristics. This may be in part due to the large number of isomers present in the olefin feed stream, and to the extent of branching of the molecules, particularly those resulting from polymerization of lower molecular weight olefins. The property of plasticizer efficiency is an important one, for the plasticizer is generally more expensive than the resin in which it is incorporated, and that plasticizer is most efficient which imparts the highest degree of flexibility for a given concentration. Heat and light stability are particularly of importance in connection with use of the plasticized resin in electrical insulation service. In the past, Oxo alcohol esters have tended to be deficient particularly in this use.

It is the principal object of the present invention to provide the art with a new source of esters of polybasic acids which have outstanding plasticizing properties, particularly in terms of thermal stability and plasticizing efficiency. It is also an object of the present invention to provide a feed stock for the Oxo reaction which results in alcohols and esters of outstanding plasticizing characteristics. A still further object of the present invention is the production of plasticized compositions having superior physical and chemical properties. Still other objects will appear from the subsequent description.

It has now been found that certain selected narrow boiling olefin cuts obtained by (1) steam cracking petroleum fraction and (2) thereafter treating the cracked products with selected polymerization catalysts, (3) separating a raffinate, and (4) fractionating the raffinate results on oxonation in alcohol which on esterification, yield plasticizers having outstanding characteristics and superior to those now commercially available, such as 2-ethyl hexanol. Indeed, the phthalate of the $C_7$ alcohol prepared from this source is at least equivalent to di-2-ethyl hexyl phthalate in heat stability, of the same order of magnitude in volatility, and superior in plasticizing efficiency.

The process of subjecting petroleum fractions of suitable boiling range to a steam or vapor phase cracking operation has of recent years assumed extensive commercial application. The process makes available not only olefins but also potentially affords a large source of valuable aromatic compounds, such as benzene, toluene, and xylene. The naphtha fractions, such as the 20–260° C. cut, which is rich in valuable aromatic hydrocarbons, contain in addition substantial quantities of olefins, diolefins, naphthenes and acyclic hydrocarbons and olefins. These fractions contain in particular large amounts of reactive tertiary alkenes and dienes in the $C_5$–$C_8$ range, and the unsaturates may constitute a major portions of these aromatic concentrates.

According to one embodiment of the present invention, superior carbonylation feeds are obtained by removing certain types of dienes, such as cycloalkadienes from the olefin-aromatic concentrate, thereafter treating the concentrate with an aluminum chloride catalyst to obtain a limited and selective reaction of the alkenes present.

Control of the catalytic polymerization of the dienes and alkenes in using an aluminum chloride catalyst can be determined from the extent to which the Type I alkenes are reacted. Type I alkenes are also known as alpha, primary alkenes, e. g. pentene-1, hexene-1, heptene-1, 3-methyl-hexene-1, and octene-1. Less than 20 wt. percent of these alkenes should be reacted while nearly all the dienes and a major portion of the Type III or alkenes having tertiary carbon constituents connected by double bonds are converted to resins of high softening point (about 80° C. or higher), and other high boiling substances. The types of olefins herein designated are in accordance with the classification of Schmidt and Boord, J. A. C. S. vol. 54, page 751.

To accomplish the controlled conversion of dienes and tertiary alkenes to resins with limited reaction of the alpha, primary alkenes, the olefinic-aromatic concentrates are treated with 0.25 to 2.0 wt. percent $AlCl_3$ at temperatures of —10° to 70° C., preferably 0° to 60° C.

The degree of conversion is most important. This is dependent on catalyst concentration, and contact time. These two variables being held constant, conversion is not affected greatly by temperature over the range of 0 to 60° C.

A preferred process for preparing the selected feed stock of the present invention is shown in the figure. Naphtha and higher boiling petroleum stocks are cracked in reactor 2 at high temperatures of about 538 to 816° C., and generally under low total pressures of 1 to 10 atmospheres, with steam or inert gas as a diluent. After suitable separation of cracked gases and volatile materials, a product boiling in the range of about 5 to 120° C. and containing substantial amounts of aliphatic olefins and diolefins, cyclic mono and diolefins as well as paraffins and aromatics, is passed via line 4 to thermal soaker 6 wherein, at a temperature of about 80–120° C. and a residence period of 4–20 hours, the cyclic dienes, such as cyclopentadiene, methyl cyclopentadiene, etc., are dimerized selectively.

Dimerized cyclic diolefins and unreacted hydrocarbons are passed to distillation equipment 8 wherein at atmospheric or subatmospheric pressures, to minimize depolymerization, a $C_5$–$C_8$ fraction is taken overhead through line 10 and a $C_{10+}$ bottoms product, including cyclic dimers, is withdrawn through line 12. The hydrocarbon distillate, including aromatics, olefins, non-cyclic dienes, etc., is passed to fractionator 13.

Fractionating column 13 is used for removing all or part of the $C_5$ hydrocarbons which are lower boiling than about 38° C., for example, isoprene. It serves also to remove any water from the hydrocarbon stream which yields a bottoms product to be withdrawn from fractionator 13 by line 14. Any distilled hydrocarbons, lower boiling than the aromatics and $C_{5+}$ olefins and hydrocarbons and water vapor are removed overhead by line 11. The bottoms boiling principally in the range of about 38° C. to 130° C. represents a suitable feed for the subsequent aluminum chloride polymerization. On occasions it may be desirable to bypass a small portion of stream 10 around fractionator 13 by valved line 9.

Details of the aluminum chloride polymerization treatment are discussed below, but at this point it should be noted that the purpose and function of the aluminum chloride polymerization is to react particularly tertiary alkenes and conjugated dienes in such a manner as to form valuable high softening point resins without removing, to any appreciable extent, Type I olefins or the aromatic hydrocarbons. It has been found that the aluminum halides, such as the chloride and bromide polymerization treatment can be used to obtain these objectives and acts more effectively than other agents for eliminating sludge-forming substances if the prescribed steps are followed.

The aluminum chloride treatment may be carried out batchwise or continuously. It involves the addition of a proper amount of $AlCl_3$ catalyst in the range of 0.25 to 2% through line 18 to the hydrocarbon mixture to be treated in polymerizer or resin plant 15. The hydrocarbon-catalyst mixture is vigorously agitated for about 0.25 to 2.0 hours at —10° to 70° C., preferably at 0° to 60° C. The extent of reaction should be carefully watched to avoid excessive reaction which would cause Type I olefin and aromatic losses. To stop the reaction, the reaction mixture is treated by adding a polar substance, such as water or alcohol, and then by adding a washing agent. After washing the reaction product to remove essentially all residual catalyst and catalyst residues, the hydrocarbon product may be contacted with aqueous caustic solution at temperatures of 90° to 300° C. to hydrolyze any alkyl chlorides or $AlCl_3$ hydrocarbon complexes present. The caustic treated product is passed by line 22 into a fractionating still 23. In still 23 the lightest hydrocarbons including the Types I and II olefins and the aromatic hydrocarbons to be recovered are taken overhead through line 24. The high softening point resin product is withdrawn as bottoms through line 26.

The overhead product, now consisting essentially of unreacted monoolefins from which most of the Type III have been removed, and of aromatics, may be passed to an additional fractionator tower 30. In this equipment, a $C_5$ and low boiling, branch chain $C_6$ fraction consisting of olefins and paraffins boiling below benzene is taken as an overheads cut through line 32. As a side stream, through line 34, is withdrawn the benzene concentrate and as a bottoms product there is withdrawn through line 33 a $C_7$ and heavier fraction.

The benzene fraction, boiling in the range of about 40 to 85° C. and containing benzene, as well as olefins and paraffins boiling in this range is passed via line 34 to extraction tower 36 wherein in a conventional manner, it is extracted with a selective solvent, such as phenol. The extract is withdrawn for benzene recovery through line 38. The raffinate, containing olefins and paraffins, is passed through line 40, and may be combined with the overhead from tower 30, and passed to fractionating towers 46 and 48. A heavy fraction, boiling above $C_6$ olefins is withdrawn as a bottoms from tower 46 through line 47; this may be employed in motor gasoline blends. From the bottom of tower 48 there is withdrawn, through line 50, a $C_6$ olefin fraction, boiling in the range of from 57–71° C. It is the alcohol product derived from this olefin cut that has on phthalation, the outstanding plasticizing characteristics previously mentioned.

The separation and recovery of the benzene fraction in the manner described is a convenient method of operation, but does not constitute an essential part of the invention. Benzene may be recovered by other means, such as fractional distillation or, if desired, may be passed to the carbonylation stage along with the olefin feed.

The olefin is passed through line 50 to mixer 54, wherein cobalt naphthenate or oleate or other suitable cobalt catalyst is added through line 56 in such proportions that the amount of cobalt in solution is about 0.05–0.3 wt. percent of the total liquid. The mixture is then pumped to preheater 58 wherein it is brought to the desired temperature range and then discharged via line 60 to the bottom of primary carbonylation reactor 62. Reactor 62 comprises a high pressure reactor vessel which may, if desired, be packed with non-catalytic material such as ceramic rings, porcelain or quartz chips, pumice and the like. It may also be divided into discrete packed zones separated by any suitable means, such as support grids, etc., or it may comprise but a single packed zone, or it may contain no packing.

A stream of synthesis gas comprising $H_2$ and CO in the approximate ratio of 0.5/1–2.0/1 volumes $H_2$/CO, preferably 1.0–1.2/1, is fed into reactor 62 through line 64. The synthesis gas stream is a composite of fresh gas and recycle, and flows upwardly with the olefin feed through reactor 62. The latter is preferably operated at a pressure of about 2500–3500 p. s. i. g. and at a carefully controlled temperature range of about 150–185° C. The rate of flow of synthesis gases and of olefin through reactor 62 is so regulated that the desired conversion level of olefin is obtained. These conditions include an olefin fresh feed rate of about 0.4–1.0 v./v./hr. or even higher, fresh synthesis gas feed rates of 1,000–10,000 cubic feet/barrel of olefin, and a nominal residence time of about 1–3 hours.

The carbonylation reaction may be carried out substantially adiabatically, that is, no external cooling means such as tubes or coils need be provided, but cooling and temperature control of the highly exothermic reaction is carried out by recycle of a portion of the product. Liquid oxygenated reaction products containing catalyst in solution, as well as unreacted synthesis gases are withdrawn from an upper portion of high pressure reactor 62 and transferred through line 66 and cooler 68 to high pressure separator 72 where unreacted gases are withdrawn overhead through line 74, scrubbed in scrubber 76 of entrained liquid, and preferably recycled to reactor 62 via lines 78 and 64. A portion of the recycle may be purged through line 80 to maintain the desired $H_2/CO$ ratio in the feed.

Liquid carbonylation product containing dissolved therein relatively high concentrations of cobalt carbonyl is withdrawn from separator 72 via line 82. A portion of this stream may be recycled to reactor 62 via line 84 to aid in the cooling and maintenance of temperature control of the primary carbonylation stage. Preferably recycle liquid product is injected at various levels within reactor 62 to obtain close temperature control throughout the whole reactor. Approximately 400–500 volume percent of liquid reaction product on the fresh olefin feed may be recycled for this purpose. The temperature of such recycled material is generally dependent on that of the atmosphere, and may be about 0–40° C.

The balance of the primary reaction product not recycled to reactor 62, which may comprise, beside desired heptyl aldehydes, also unreacted olefins, secondary reaction products, and dissolved cobalt carbonyls, is withdrawn through pressure release valve 86 and line 88 and passed to decobalting zone 90. Within decobalter 90, soluble cobalt carbonyl is removed from the aldehyde product prior to high pressure hydrogenation in order to prevent its decomposition in the subsequent hydrogenation stage with consequent fouling of coils and reactor plugging. The decomposition of the cobalt carbonyl is obtained by heating the aldehyde product by such means as steam coils, etc. to about 90–240° C. at a pressure high enough to keep the components in the liquid phase. Pressures in the neighborhood of 100–150 p. s. i. g. are preferred. The product containing catalyst in solution is injected into decobalter 90 through line 88 and a fluid, such as an inert stripping gas, water, steam, $H_2$, etc., may be added through line 92.

The liquid aldehyde product now substantially free of dissolved catalyst is withdrawn from 90 through line 96 and passed through preheater 100 to the bottom portion of hydrogenation reactor 104 via line 102. Simultaneously hydrogen is supplied to 104 through line 106 in proportions sufficient to convert the aldehydic product into heptyl alcohols. Hydrogenator 104 may contain a mass of any conventional hydrogenation catalyst, such as nickel, copper chromite, a sulfur resistant catalyst such as tungsten, nickel or molybdenum sulfide, preferably supported on carriers such as pumice, charcoal, etc. Reactor 104 is preferably operated at temperatures of about 200–300° C. and pressures of about 2500–3500 p. s. i. g.

The products from the hydrogenation reactor and unreacted hydrogen may be withdrawn overhead through line 108, passed through cooler 110 and high pressure separator 112, whence $H_2$ is removed overhead through 114 for recycle. The liquid product is withdrawn from separator 112 through line 116 and, after passing through conventional low pressure separators and stabilizers (not shown), is passed to hydrocarbon still 118, wherein are distilled overhead low boiling products, mostly hydrocarbons. These materials are removed through 120 as a heads cut and may be used as gasoline blending agents. The bottoms from this primary distillation are withdrawn from hydrocarbon still 118 via line 122 and sent to alcohol still 124 where a heptyl alcohol cut boiling within the range of 160–177° C. at atmospheric pressure is taken. However, it may be desirable to distill alcohols at reduced pressure. The alcohols are withdrawn overhead from still 124 through line 126 and sent to storage tank 128, from whence they may be sent, if so desired, to an esterification plant for conversion into a di-heptyl ester, such as di-heptyl phthalate, all in a conventional manner. High boiling bottoms from 124 may be withdrawn through line 130 and may be used in any desired manner, such as cracking stock fuel, etc., or they may be further processed and distilled at subatmospheric pressures to recover valuable oxygenated organic products.

Heptyl alcohol is passed from alcohol storage 128 through line 132 to esterification unit 134. The heptyl alcohol passed to the esterification plant has a boiling range of about 160–177° C., and an acid or an anhydride, such as phthalic anhydride, is added through line 136 and esterification may proceed either catalytically in the presence of a small amount of an acid, such as sulfuric or benzene sulfonic, or it may proceed without a catalyst merely under the influence of heat. The esterification products are removed through line 138 and passed to the ester recovery system wherein the esters, such as di-heptyl phthalate, are recovered in a conventional manner. The phthalate ester has a boiling range of about 175–204° C. at 3 mm. pressure.

The process of the present invention may be subject to numerous variations within the skill of those versed in the art. Thus it is not essential in all cases to remove the aromatics from the resin plant prior to oxonation; these may be recovered later in the process. What is essential is the treatment of the steam cracked petroleum fractions under controlled conditions to remove diolefins, tertiary mono-olefins, and the cyclic mono-olefins, and to employ the specific resulting olefin fractions. These are as follows:

| Olefin: | Boiling range, °C. |
|---|---|
| $C_6$ | 57–71 |
| $C_7$ | 88–101 |
| $C_8$ | 117–129 |

As will be shown below, it is not enough to employ olefin fractions boiling in these ranges, or even steam-cracked olefin fractions boiling therein. Only after the steam-cracked petroleum fractions have been treated as described do these fractions produce the high quality plasticizing compositions of the invention. Furthermore, broadening these ranges even by a few degrees results in a sharply decreased quality product. The close fractionation is necessary to separate the residual low boiling Type III olefins and the high boiling cyclic olefins (remaining after the $AlCl_3$ treatment) from the desired intermediate Types I and II olefins.

The process of the present invention may be further illustrated in the following examples, wherein the plasticizing characteristics of the phthalate esters prepared by the process of the present invention is compared with plasticizing esters prepared from other oxo alcohols or alcohols of similar molecular weight derived from other sources.

A sample of the resin raffinate prepared in the manner previously described was fractionated in a packed column equivalent to 15 theoretical plates using a 10/1 reflux ratio, and cuts taken which were refractionated in a 15 plate glass Oldershaw column, using a 5/1 reflux ratio. Cuts were taken in the range of (A) 57–71° C., (B) 88–101° C., and (C) 117–129° C., corresponding to the hexene, heptene and octene fractions. These cuts were subject to oxonation as described below.

As a comparison, a steam-cracked naptha fraction (D) prepared as described, but which, instead of $AlCl_3$ treatment, was treated with active clay to polymerize polymerizable constituents and thereafter extracted with phenol to remove aromatics, was also fractionated to obtain a 57-71° C. cut, which was also subjected to oxonation.

Further comparisons were made with iso-octyl alcohol (E) prepared by copolymerizing a $C_3$-$C_4$ olefin fraction and recovering a $C_7$ cut which was oxonated, the isononyl alcohol prepared by oxonating di-isobutylene (F) and with di-2-ethyl hexyl phthalate (G). The latter is well known and considered an outstanding plasticizer.

Olefin cuts A, B, C, D, E, and F were oxonated and reduced in batch equipment under the following conditions:

Oxonation:
- Temperature _____ 175° C.
- Pressure _____ 3500 p. s. i. g.
- $H_2$/CO Ratio_____ 1/1.
- Catalyst _____ Cobalt oleate in hexane.

Hydrogenation:
- Temperature _____ 185° C.
- Pressure _____ 3500 p. s. i. g.
- Catalyst _____ Nickel on kieselguhr.

The alcohols (in 10% excess) were converted to their phthalate esters by heating with phthalic anhydride and recovering water as formed. Toluene sulfonic acid catalyst and toluene entrainer were employed. The crude ester was washed twice with ⅓ of its volume of 10% NaOH and 3 times with water. It was then vacuum stripped to remove excess alcohol.

The esters were evaluated in the following resin blend:

| | Parts |
|---|---|
| Polyvinyl chloride (Geon 101) | 100 |
| Vanstay 16 | 2 |
| Lead stearate (Nat. Lead Co. DS-207) | 1 |
| Plasticizer | 50 |

Physical properties measured on the plasticized vinyl films included:
(1) Compatability
(2) Plasticizer efficiency
(3) Heat stability
(4) Volatility
(5) Extractibility
(6) Electrical resistivity.

The evaluation of the plasticizers are shown in Table I.

TABLE I

*Physical properties of phthalate ester—vinyl films*

| Phthalate Ester of— | A | B | C | D | E | F | G |
|---|---|---|---|---|---|---|---|
| | Alcohols From Resin Raffinate | | | $C_7$ Alc. From Benzene Raffinate | Isooctyl Alcohol | Nonyl Alc. (from Dimer) | 2-Ethyl Hexanol |
| | $C_7$ Alc. | $C_8$ Alc. | $C_9$ Alc. | | | | |
| Original Properties: | | | | | | | |
| Tensile | 2,890 | 2,865 | 2,950 | 2,990 | 2,930 | 2,940 | 2,840 |
| Mod. @ 100% | 1,750 | 1,800 | 2,020 | 1,750 | 1,830 | 2,340 | 1,770 |
| Elongation | 290 | 280 | 270 | 290 | 300 | 275 | 310 |
| Aged 7 Days @ 100° C.: | | | | | | | |
| Percent Tensile Retained | 93 | 85 | 84 | 89 | 79 | 99 | 90 |
| Percent Elong. Retained | 72 | 64 | 80 | 41 | 46 | 89 | 62 |
| White Oil Extraction @ 52° C.: Percent Loss—2 Days | 5.4 | 4.6 | 4.3 | 4.8 | 4.6 | 3.7 | 4.8 |
| Dynamic Mod. ×$10^{-4}$, p. s. i.: | | | | | | | |
| @ +25° C | 1.06 | 1.30 | 1.94 | 1.15 | 1.41 | 2.95 | 1.27 |
| @ +10° C | 4.4 | 5.0 | 4.8 | 5.2 | 8.2 | 4.7 | |
| @ −5° C | 12.8 | 13.7 | 14.3 | 13.6 | 15.3 | 20.9 | 13.4 |
| @ −20° C | 24.9 | 26.3 | 26.2 | 26.6 | 22.5 | 31.3 | 21.0 |
| D. C. Resistivity @ 60° C.: ×$10^{10}$ | 9.04 | 11.2 | 13.5 | 11.6 | 10.6 | 23.7 | 7.50 |

In the evaluations, retained extensibility is the main criterion of heat stability as well as tensile and color retention. Plasticizer efficiency indicates the ability of a plasticizer to impart flexibility to vinyl resin, and dynamic modulus measurements are used for this purpose, low modulus values being desirable.

A summary of these results are found in Table II.

TABLE II

*Oxo alcohol phthalate plasticizers summary of evaluation results*

| Phthalate Ester of— | Dynamic Modulus ×$10^{-4}$ @ 25° C. | Estimate Parts Plast.* Equivalent to 50 of DOP | Heat Stability, 7 Days @ 100° C., Percent Elong. Ret. | Volatility, 4 Days @ 100° C., Percent Loss | White Oil Extraction, 2 Days @ 52° C., Percent Loss |
|---|---|---|---|---|---|
| $C_7$ Resin Raffinate Alc. (A) | 1.06 | 48.0 | 72 | 16.6 | 5.4 |
| $C_8$ Resin Raffinate Alc. (B) | 1.30 | 50.0 | 64 | 6.5 | 4.6 |
| $C_9$ Resin Raffinate Alc. (C) | 1.94 | 56.5 | 80 | 2.9 | 4.3 |
| $C_7$ Alcohol from Clay treated stock (D) | 1.15 | | 41 | 17.5 | 4.8 |
| Isooctyl Alcohol (E) | 1.41 | 51.5 | 46 | 9.4 | 4.6 |
| Nonyl Alcohol (F) | 2.95 | Est. 66 | 89 | 9.3 | 3.7 |
| 2-Ethyl Hexanol (G) | 1.27 | 50 | 62 | 14.5 | 4.8 |

*0.05 Units in Dynamic Modulus is equiv. to approx. 0.5 part of plasticizer/100 of vinyl.

From the data in Tables I and II it is clearly seen that in particular the phthalate esters of the heptyl and octyl alcohols prepared in accordance with the process of the present invention compare as follows with the phthalate ester of 2-ethylhexanol, currently accepted as one of the best plasticizers in the plastics industry today:

| Criteria | Position in respect to di-2-ethylhexyl phthalate | |
|---|---|---|
|  | $C_7$ Resin Raffinate Alcohol | $C_8$ Res. Raf. Alcohol |
| Efficiency at +25° C. | Better | Equivalent. |
| Heat Stability (7 days @ 100° C.) | do | Do. |
| Volatility (4 days @ 100° C.) | Equivalent | Better. |
| Extraction (2 days @ 52° C.) | Subst. equivalent | Equivalent. |

Thus it can be seen that in particular the heptyl alcohol obtained by oxonation of a $C_6$ resin raffinate cut is an outstanding plasticizer alcohol.

In Tables I and II, the $C_7$ alcohol from $C_6$ resin raffinate olefins has been shown to be a superior plasticizer not only to the di-2-ethyl hexyl phthalate, but also to the phthalate of the octyl alcohol prepared by polymerizing propylene and butylenes and recovering the $C_7$ fraction. In Table III below it can readily be seen that the $C_7$ resin raffinate alcohol is far superior to the $C_7$ alcohol prepared by oxonation of the $C_6$ olefin from the propylene-butylene copolymerization process. The latter alcohol, as the phthalate, is particularly deficient in heat stability.

TABLE III

Comparison of Phthalate Plasticizers—Physical Properties of:

| Phthalate Ester | Plasticized Resin after 7 days at 100° C. | | |
|---|---|---|---|
|  | Percent Tensile Str. Retained | Percent Elongation Retained | Volatility [1] |
| Di-2-ethyl hexyl phthalate | 86 | 62 | 13.0 |
| Di-isooctyl alcohol (from $C_7$ olefin polymer fraction) | 82 | 46 | 9.4 |
| Di-isoheptyl alcohol (from $C_6$ olefin polymer fraction) | 58 | 30 | 16.2 |
| Di-heptyl alcohol ($C_6$ resin raffinate) | 93 | 72 | 16.6 |
| Di-heptyl alcohol ($C_6$ clay treated) | 89 | 41 | 28.1 |

[1] Percent plasticizer loss after 4 days at 100° C.

The alcohols prepared in accordance with the present invention had the following characteristics:

|  | $C_7$ | $C_8$ | $C_9$ |
|---|---|---|---|
| Boiling Range °C | 160–175 | 177–195 | 197–215 |
| Hydroxyl No ceq./gm | .86 |  |  |
| Carbonyl No ceq./gm | .003 |  |  |
| Refractive Index percent | 1.42 |  |  |
| Density (20/4) | .8356 |  |  |
| Viscosity | 9.4 | 12.0 | 16.7 |

The corresponding phthalate esters had the following analyses:

|  | $C_7$ | $C_8$ | $C_9$ |
|---|---|---|---|
| Boiling Range, °C | 195–210 (1.5 mm.) | 212–215 (0.8 mm.) | 215–225 (1.2 mm.) |
| Saponification No ceq./gm | 0.555 |  |  |
| Neutralization No ceq./gm | 0.000 |  |  |
| Alcohol No ceq./gm | 0.008 |  |  |
| Refractive Index (M 20/D) | 1.4885 |  |  |
| Carbonyl No ceq./gm | 0.007 |  |  |
| Density | 1.0003 |  |  |
| Bromine No ceq.Br$_2$/gm | 0.18 |  |  |
| Viscosity | 5+ | 77 | 105 |

The boiling point range of the olefin described is critical as indicated by the data in Table IV. As previously noted a 57–71° C. cut gives an excellent plasticizer alcohol.

TABLE IV

Cut point summary ($C_6$ olefin)

| Boiling Range, °C | 53–69 | 57–69 | 60–69 | 60–72 | 60–75 |
|---|---|---|---|---|---|
| # of determinations | 7 | 7 | 9 | 4 | 7 |
| After 7 days at 100° C.: |  |  |  |  |  |
| Percent Tens. Retained | 92 | 95 | 92 | 94 | 92 |
| Percent Elongation Retained | 62 | 63 | 65 | 62 | 59 |
| Percent Plasticizer Lost | 22 | 31 | 30 | 30 | 33 |
| Percent Extraction Lost | 11.4 | 11.7 | 11.7 | 11.6 | 11.7 |
| Dynamic Modulus×10$^{-4}$— |  |  |  |  |  |
| +25° C | 0.96 | 0.98 | 1.02 | 0.99 | 0.96 |
| −20° C | 21.5 | 21.5 | 21.4 | 21.5 | 21.0 |

From the above data it is clearly seen that relatively small variations on either side of the critical boiling range of the resin raffinate olefin is accompanied by decreases in plasticizing qualities of the corresponding phthalate ester.

The $C_6$ olefin cut from the resin raffinate was subject to an olefin and olefin type analysis. As a comparison, the same product treated with active clay instead of $AlCl_3$ under the controlled conditions is shown. The clay treated run corresponds to "D" in Table I.

TABLE V

|  | Resin Raffinate (A) | Benzene Raffinate (D) |
|---|---|---|
| Cylic Olefins: |  |  |
| Cyclopentene | 1.3 | 2 |
| 3-methyl cyclopentene | 13.0 | 13 |
| Linear Olefins: |  |  |
| Type I | 60 | 50 |
| Type II | 19 | 15 |
| Type III | 4 | 8 |
| Type IV | 2 | 12 |
| Type V | 0 | 0 |

The above data show that the resin raffinate has substantially greater amounts of primary and secondary olefins than the product originating from the same source, i. e. steamcracking, but treated with active clay rather than with $AlCl_3$. This high proportion of primary and secondary olefins may be at least in part responsible for the superior qualities of the alcohol product for plasticizing purposes.

A sample of the resin raffinate $C_6$ olefin was hydrogenated and analyzed for paraffin content, with the following results:

TABLE VI

|  | Percent |
|---|---|
| C—C—C—C—C—C | 81 |
| C—C—C—$\overset{\text{C}}{\underset{\mid}{\text{C}}}$—C | 5 |
| C—C—$\overset{\text{C}}{\underset{\mid}{\text{C}}}$—C—C | 2 |
| Cyclic (by difference) | 12 |

These results show that 81% of this fraction is straight chain, while Table V showed about 60% of the resin raffinate to be hexene-1.

What is claimed is:

1. A process for producing alcohols from steam cracked petroleum fractions which comprises contacting a $C_6$–$C_8$ olefinic steam cracked petroleum fraction containing substantial amounts of diolefins and tertiary monoolefins as well as primary and secondary monoolefins, with 0.25 to 2.0 weight percent $AlCl_3$ at temperatures from −10° to 70° C. until said diolefins and tertiary monoolefins are selectively polymerized and said primary and secondary monoolefins remain substantially unreacted, recovering an unreacted olefin stream boiling over the range of 57° to 71° C., contacting said unreacted olefin stream with carbon monoxide and hydrogen in the presence of a cobalt carbonylation catalyst at elevated temperatures and pressures to form an aldehyde carbonylation product, and hydrogenating said carbonylation product to said alcohols capable of producing effective plasticizers.

2. A process for producing alcohols from steam cracked petroleum fractions which comprises isolating a hexene-rich steam cracked petroleum fraction boiling in the range of about 38° to 130° C. which contains substantial amounts of diolefins and tertiary monoolefins as well as primary and secondary monoolefins, heat soaking said fraction to a temperature and for a period sufficient to dimerize substantially all cyclodienes, passing the substantially cyclodiene-free product to a polymerization zone, contacting said product with 0.25 to 2.0 weight percent $AlCl_3$ at a temperature from —10° to 70° C. for about 0.25 to 2.0 hours until said diolefins and tertiary monoolefins are selectively polymerized and said primary and secondary monoolefins remain substantially unreacted, fractionating the raffinate recovered from said polymerization zone to isolate an olefin fraction boiling over the range of 57° to 71° C., contacting said unreacted olefin stream with carbon monoxide and hydrogen in the presence of a cobalt carbonylation catalyst at elevated temperatures and pressures to form an aldehyde carbonylation product, and hydrogenating said carbonylation product to said alcohols capable of producing effective plasticizers.

3. The process of claim 2 wherein said product from said polymerization zone is passed to an extraction zone for the removal of aromatics to form an extract and a raffinate, and said raffinate distilled and the fraction boiling in the range of 57–71° C. passed to said carbonylation zone.

4. The process of claim 2 wherein said alcohol product boils in the range of 160–175° C. at atmospheric pressure.

References Cited in the file of this patent

UNITED STATES PATENTS

| | | |
|---|---|---|
| 2,015,088 | Reid | Sept. 24, 1935 |
| 2,386,055 | Mottern | Oct. 2, 1945 |
| 2,412,469 | Nicholl et al. | Dec. 10, 1946 |
| 2,625,527 | Smith et al. | Jan. 13, 1953 |
| 2,648,932 | Cohen et al. | Nov. 10, 1953 |
| 2,752,386 | Ackroyd et al. | June 26, 1956 |
| 2,752,395 | Harvey et al. | June 26, 1956 |
| 2,754,321 | Hoog et al. | July 10, 1956 |

FOREIGN PATENTS

| | | |
|---|---|---|
| 678,926 | Great Britain | Sept. 10, 1952 |

OTHER REFERENCES

Hoog: Proc. 3rd. World Petrol. Congress—Sec. V., pps. 9–12, 16, 18 and 19 (1951).